US005850708A

United States Patent [19]
Bergevin

[11] Patent Number: 5,850,708
[45] Date of Patent: *Dec. 22, 1998

[54] SURFACE FOR SPORTS AND OTHER USES

[75] Inventor: Jerry G. Bergevin, Edmonds, Wash.

[73] Assignee: Turf Systems International, Inc., Lynnwood, Wash.

[*] Notice: The term of this patent shall not extend beyond the expiration date of Pat. No. 5,489,317.

[21] Appl. No.: 744,758

[22] Filed: Nov. 6, 1996

Related U.S. Application Data

[63] Continuation-in-part of Ser. No. 334,414, Nov. 4, 1994, Pat. No. 5,586,408, which is a continuation of Ser. No. 78,624, Jun. 17, 1993, abandoned, which is a continuation-in-part of Ser. No. 902,147, Jun. 22, 1992, abandoned.

[51] Int. Cl.[6] .............................. A01C 29/00; A01C 1/04; A01B 79/00; A01N 3/00
[52] U.S. Cl. .................................. 47/1.01; 47/56; 47/58; 428/17
[58] Field of Search ................................ 47/1.01, 58, 56; 428/77

[56] References Cited

U.S. PATENT DOCUMENTS

| | | | |
|---|---|---|---|
| 3,446,122 | 5/1969 | Raichle et al. | 94/7 |
| 3,703,786 | 11/1972 | Swan | 47/56 |
| 4,007,556 | 2/1977 | Gluck et al. | 47/56 |
| 4,023,506 | 5/1977 | Robey | 111/1 |
| 4,073,753 | 2/1978 | Hauge | 260/2.3 |
| 4,318,248 | 3/1982 | Muldner | 47/56 |
| 4,462,184 | 7/1984 | Cunningham | 47/58 |
| 4,501,420 | 2/1985 | Dury | 272/3 |
| 4,572,700 | 2/1986 | Mantarro et al. | 404/35 |
| 4,755,401 | 7/1988 | Friedrich et al. | 428/17 |
| 4,852,870 | 8/1989 | Hawkins et al. | 272/3 |
| 5,014,462 | 5/1991 | Malmgren et al. | 47/9 |
| 5,205,068 | 4/1993 | Solomou | 47/56 |
| 5,489,317 | 2/1996 | Bergevin | 47/1.01 |
| 5,586,408 | 12/1996 | Bergevin | 47/1.01 |

FOREIGN PATENT DOCUMENTS

| | | |
|---|---|---|
| 0 154 841 | 2/1985 | European Pat. Off. . |
| 0 174 755 | 3/1986 | European Pat. Off. . |
| 0 204 381 | 12/1986 | European Pat. Off. . |
| 0261769A1 | 3/1988 | European Pat. Off. . |
| 263566A1 | 4/1988 | European Pat. Off. . |
| 0 373 282 | 12/1988 | European Pat. Off. . |
| 0 403 008 | 12/1990 | European Pat. Off. . |
| 2 333 534 | 1/1977 | France . |
| 2 556 381 | 6/1985 | France . |
| 25 22 864 | 12/1976 | Germany . |
| 32 26 830 | 1/1984 | Germany . |
| 33 13 329 | 10/1984 | Germany . |
| 36 02 060 | 7/1987 | Germany . |
| 37 03 866 | 8/1988 | Germany . |
| 37 23 364 | 1/1989 | Germany . |
| 59-151813 | 8/1984 | Japan . |
| 4-24432 | 2/1992 | Japan . |
| 8500946 | 10/1986 | Netherlands . |
| 2225240 | 5/1990 | United Kingdom . |
| 91/00202 | 4/1992 | WIPO . |
| 92/07142 | 4/1992 | WIPO . |

OTHER PUBLICATIONS

Notts Sport, "Notts Sport Grass Reinforcement Passes Tough Scottish Trials," *Notts Sport News*, Grass Reinforcement Ed., 2 pgs. (1990).
Notts Sport, "Stonehenge Trials Lead to More Orders," *Notts Sport News*, Grass Reinforcement Ed., 2 pgs. (1990).
Notts Sport, "Children at Play—The Next Four Years," *Notts Sport News*, Child's Play Ed., 2 pgs..
Safety Play Systems Inc., "Keep Off—Your Feet Are Killing Me!" *Notts Sport News*, Golf Ed., 2 pgs.
Safety Play Systems Inc., "The 'Envelope' Base System," 6 pgs. (1992).
Netlon Advanced Turf–Rootzone Technology–Stronger by Nature, Netlon, Blackburn, England, Jan., 1992.
Netlon Advanced Turf–Where Turf Alone Would Fail, Netlon, Blackburn, England, 7 pgs.
"The Tried and Tested Sand–Filled Artificial Turf," *DLW Sportfloor*, date unknown.
"Sand–Filled Artificial Turf–We Take Nature as our Model," *DLW Sportfloor*, date unknown.
"Brabauts Dagblad" (newspaper), Jul. 14, 1992, Holland.
Etter, "How Kentucky Bluegrass Grows" (undated).
"Young Utes will depend on home advantage," The Fresno Bee, Aug. 23, 1995 (pp. D1, 5, 6).
"Grass Finally Grows at Rice Stadium," The Salt Lake Tribune, Aug. 28, 1995 (p. D–1, 6).
"The Green Grass of Gridirons Begins to Make a Comeback," The New York Times, Sep. 3, 1995 (pp. 1, 24).
"Start–up in McLean fields entry in athletic–turf wars," Washington Business Journal, Feb. 10–16, 1995 (p. 3).
"A Special Background Report on Trends in Industry and Finance," The Wall Street Journal, Jan. 26, 1995.
"Utes Break New Ground," publication of the University of Utah.
Neat stuff at the 'Other Show', Golf World, Apr. 1995 (p. 144).
"Utah has a tough new turf," Deseret News (undated) (pp. D1, 8).

*Primary Examiner*—David T. Fox
*Assistant Examiner*—Kent L. Bell
*Attorney, Agent, or Firm*—Christensen O'Connor Johnson & Kindness PLLC

[57] ABSTRACT

An improved playing surface including a synthetic turf base positioned atop a foundation. The synthetic turf base includes synthetic grass fibers secured to a backing material. The synthetic turf base also includes a surface layer of growth medium intermixed with the synthetic grass fibers. Natural grass is planted in the surface layer of growth medium wherein the natural grass includes natural grass blades and roots. The backing is provided with perforations or openings sufficient in number to permit the roots of the natural grass to extend through the backing into the sub-base of the foundation. The improved playing surface may include synthetic grass fibers of varying lengths, longer synthetic grass fibers can be formed of contrasting colors in order to provide line and boundary indicators. A mesh-type material is placed underneath the adjoining layers of backing material in order to reinforce the interface between separate sections of backing material.

25 Claims, 9 Drawing Sheets

TYPICAL METHOD OF APPLICATION
(SHOWN USING OPTIONAL OVERLAPPING FABRIC)

SEEDED OR
SODDED PANELS

SURFACE FOR SPORTS AND OTHER USES

FIELD OF THE INVENTION

This is a continuation-in-part of U.S. patent application Ser. No. 08/334,414, filed Nov. 4, 1994, by Jerry G. Bergevin, entitled IMPROVED SURFACE FOR SPORTS AND OTHER USES, now U.S. Pat. No. 5,586,408, which is a continuation of U.S. patent application Ser. No. 08/078,624, filed Jun. 17, 1993, now abandoned, which is a continuation-in-part of U.S. patent application Ser. No. 07/902,147, filed Jun. 22, 1992, now abandoned, the disclosure of which is incorporated herein, in its entirety, by the foregoing reference thereto.

TECHNICAL FIELD OF THE INVENTION

The present invention is directed toward an improved surface for sports and other uses and, more particularly, toward a combination artificial and natural surface and method of making the same.

BACKGROUND OF THE INVENTION

For years natural turf surfaces were used for most outdoor sports, for example, soccer, football, field hockey, cricket, rugby, etc. Natural turf surfaces are surfaces constructed with a grass grown in soil, or some other surface layer of material (e.g., sand and organic mixes, etc.), that is constructed upon a suitable foundation. A natural turf surface is generally preferred for its comfort, feel, grip, and appearance.

However, under heavy use and/or poor weather conditions, natural turf surfaces deteriorate rapidly and maintenance is costly. Intense activity on the turf destroys the grass and its root system, leaving mud and/or dirt as the playing surface. During this time, prior to re-establishment, the surface is often pockmarked, uneven, and possibly even hazardous to use.

Another problem associated with natural turf surfaces is the use of painted on yardage and boundary lines. Typically, such boundary lines are formed by painting the playing surface. For aesthetic reasons, such lines are generally painted just prior to each official game played on the playing surface. The repeated application of paint to the surface of the playing surface tends to kill the grass that is located under the painted surface. In addition, over time the multiple layers of paint build up forming a surface that is substantially harder than the surrounding natural grass playing surface. Thus, the painted areas of the playing surface can create slippery spots within the playing surface, possibly leading to slips and falls by athletes using the playing surface. In addition, the painted areas can increase the possibility of injury to the athlete and create hard spots that can be uncomfortable or painful to an athlete that falls upon the painted area.

Due to the needs of sports programs, play usually continues on the playing surface, even when the surface is badly damaged, until the sport's season is over, when the turf can be re-established. Thus, the playing conditions on the playing surface continually decline over the season. At the end of the season, the natural turf surfaces are reseeded, the divots leveled and filled, etc. The natural turf surfaces are not usable during this re-establishment period because use defeats the re-establishment of the turf. The re-establishment period typically takes at least four months, or longer, under ideal weather conditions, during which the natural turf surface should not be used.

Recently, synthetic turf surfaces have been used as an alternative to natural turf surfaces. Synthetic turf surfaces generally come in two types, i.e., conventional and sand filled. Conventional synthetic turf is a dense synthetic material that has the appearance of dense grass blades but is manually placed indoors or outdoors, usually upon an asphalt, concrete, wood, or other foundation. Sand-filled synthetic turf is a synthetic material similar to conventional synthetic turf, but with greater spacing between the blades, to accommodate a silica sand filling.

Both the conventional and sand-filled synthetic turf are placed indoors or outdoors, upon a foundation that may include an asphalt, concrete, wood or other supporting subsurface along with cushioning mats, water drainage and water irrigation.

Although synthetic turf surfaces are more durable and consistent than well-established natural turf surfaces, they are regarded as only moderately successful for sports and other uses. The most notable disadvantage of synthetic turf surfaces is the discomfort for the players and an increased number of injuries. Additionally, synthetic turf surfaces are generally expensive to put in place and have a life expectancy of 8–15 years, if properly maintained, and for less if poorly maintained. Outdoor synthetic turf surfaces also remove large areas from the ecosystem, reducing natural processes including ground water recharge, oxygen and carbon monoxide balance, temperature modulation, and dust filtration. For these and other reasons, a number of synthetic turf surfaces are currently being converted back to the natural turf surfaces.

As can be seen from the above discussion, there exists a need for an improved surface for sports and other uses, and a method of making the improved surface, wherein the surface provides improved comfort and fewer injuries to the users, while being durable under heavy use and in poor weather conditions. The present invention is directed toward fulfilling this need.

SUMMARY OF THE INVENTION

The present invention provides an improved surface for sports fields and for other high traffic uses. In one embodiment, the surface includes a foundation and a growth medium filled synthetic turf positioned atop the foundation. The synthetic turf base includes synthetic grass fibers attached to a permeable backing material with a layer of growing medium filled between the synthetic grass fibers. The synthetic grass fibers are constructed of a flexible, synthetic material and extend generally vertically upward from the backing material.

In one embodiment, the playing surface includes a foundation and a synthetic grass turf located on top of the foundation. The synthetic grass turf includes a backing material and a plurality of synthetic grass fibers extending generally vertically upward from the backing material. The synthetic grass fibers are formed of at least a first group of fibers having a first length and a second group of fibers having a second length that is longer than the first length so that the second group of fibers extend upward from the backing material a greater distance than the first group of fibers. A layer of growth medium is disposed in the synthetic grass turf to a depth sufficient to substantially fill the synthetic grass turf to the top of the first group of fibers. Grass is planted in the growth medium so that the roots grow downward through the growth medium, through the backing material, and into the foundation. The blades of the grass grow upward from the top of the growth medium to form a playing surface.

In accordance with other aspects of the invention, the second group of fibers are uniformly interspersed throughout the playing surface. The second group of fibers extend upward and are intertwined with the natural grass blades. The first group of fibers protect the crowns of the grass plants, while the second group of fibers help to protect the blades of the grass plants.

In accordance with other features of the invention, the second group of fibers are formed of a color that contrasts with the grass and provides a visual indicator. The second group of fibers are placed in an organized pattern to provide boundary indicators, line indicators, etc. The backing material in the region of the second group of fibers is formed of a material that is root-impervious. The backing material also includes a herbicide to prevent natural grass plants from growing into and through the backing material in the region of the second group of fibers.

In accordance with other aspects of the invention, the backing material is formed of a woven material. The woven material is provided some in-plane stability through the use of fusing the strands of the woven material along the edges of the synthetic grass turf.

In accordance with yet other aspects of the invention, a mesh material is placed beneath the foundation and the synthetic grass turf. The mesh material is located in the region of adjoining edges of the synthetic grass turf and underlies the adjoining edges of the synthetic grass turf. The roots of the grass plants grow through the synthetic grass turf, through the mesh material, and into the foundation, thus binding different pieces of the synthetic grass turf to the mesh material and the foundation. The mesh material can include protrusions extending from either one or both sides of the mesh material. The protrusions extend into the foundation and into the backing material in order to help anchor the edges of the synthetic grass turf.

The playing surface of the present invention improves the durability and visual appearance of natural grass playing surfaces. The playing surface of the invention helps to protect the crowns of the natural grass plants, thus helping to prevent damage to the natural grass. This allows the present invention to produce a playing surface that recovers more quickly than natural grass playing surfaces. However, the playing surface of the present invention is formed substantially of natural grass blades thus providing the comfort and appearance of a natural grass playing surface. The playing surface of the invention can also be formed with built-in visual indicators such as boundary or line indicators. Such line indicators do not have the disadvantages of prior painted-on line indicators.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1A:
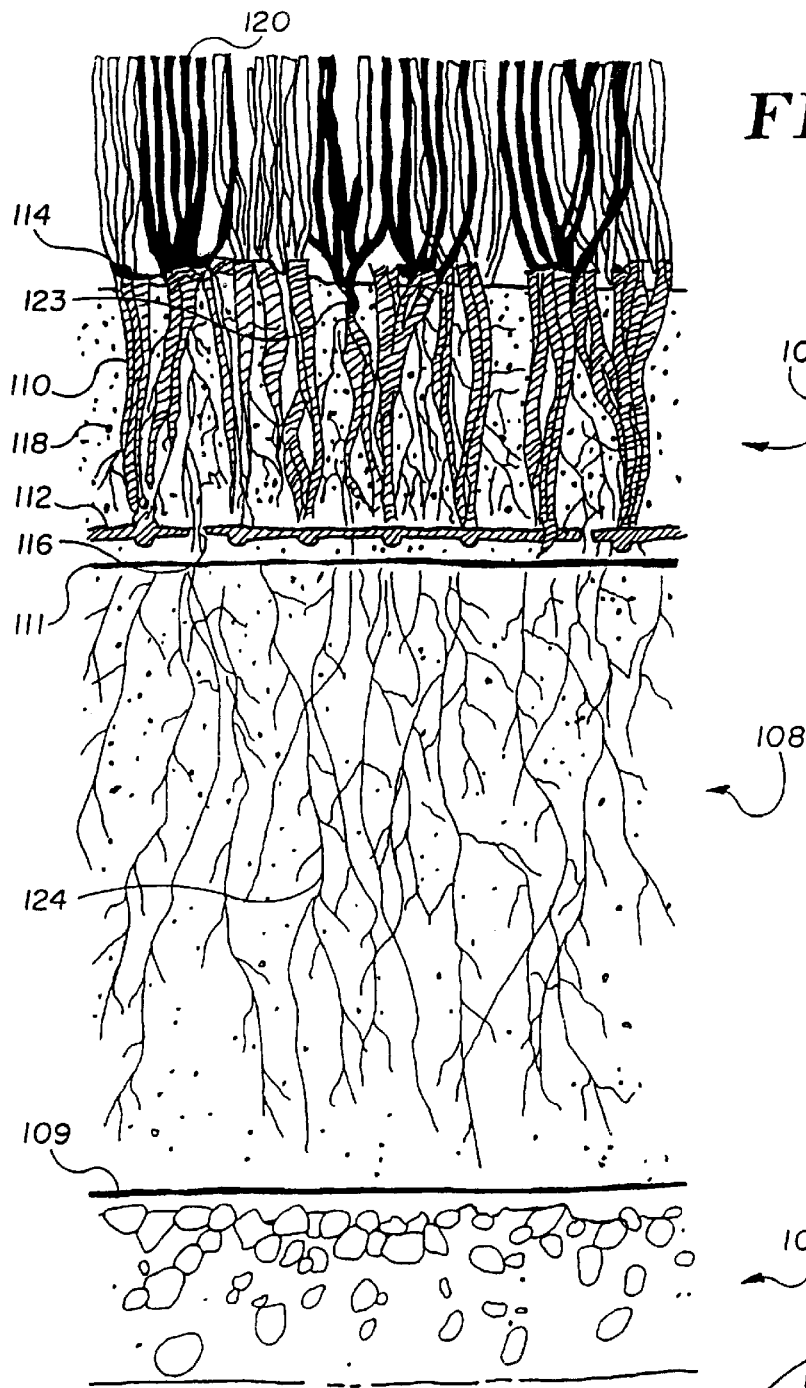
FIG. 1A is a cross sectional view of a first embodiment of an improved surface of the present invention.
Figure 1B:
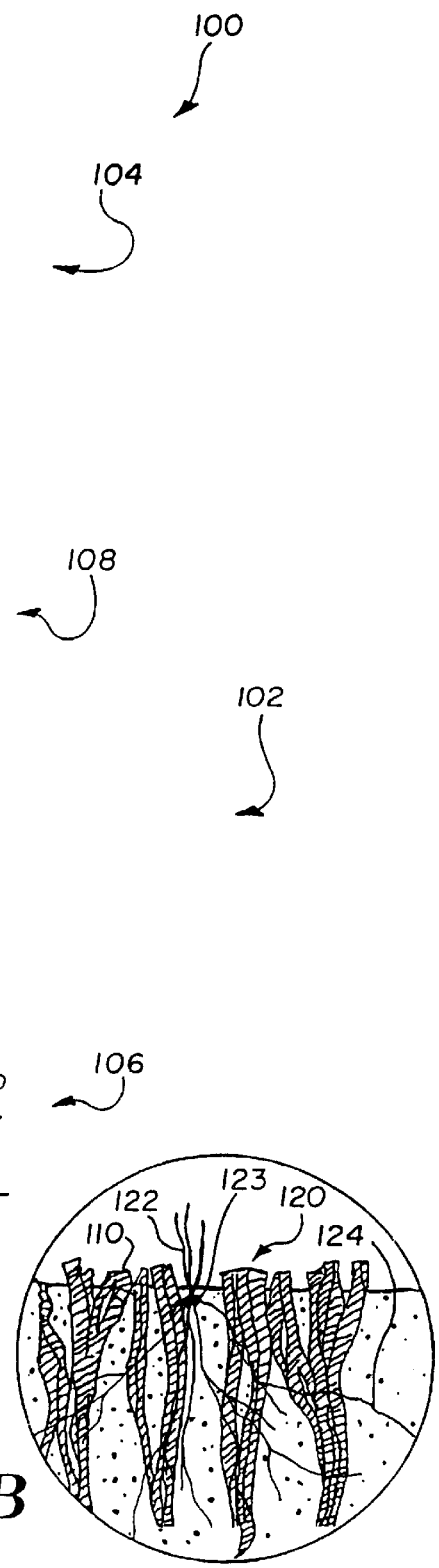
FIG. 1B is an enlarged cross sectional view of a portion of the surface of FIG. 1A.

A preferred embodiment of an improved surface 100 according to the invention is illustrated in FIGS. 1A and 1B. The improved surface 100 includes a foundation 102 upon which is mounted a synthetic turf base 104. The foundation 102 is constructed of a sub-grade 106 and a sub-base 108. The sub-grade 106 is constructed for providing a structural base. The sub-grade 106 may be formed of earth and rock existing on the site as is known in the art. Further, piping (not shown) may be placed in or on the sub-base 108 to provide drainage and/or irrigation to the sub-base 108. A sub-grade for use with the invention may be readily provided by those skilled in the art.

The sub-base 108 is positioned atop the sub-grade 106 and is constructed, among other things, to provide sufficient drainage of water from the improved surfacing 100 to the sub-grade 106. The sub-base 108 is further constructed to provide structural support to the synthetic turf base 104 and a growing medium, as will be discussed more fully below. The sub-base 108 may be constructed of any combination of materials known to those skilled in the art such as, for example, sand, rubber, rock, and other organic and/or inorganic materials. Like the sub-grade 106, the sub-base 108 may be readily constructed by those skilled in the art.

A first filter (optional) 109 is positioned intermediate the sub-grade 106 and the sub-base 108 and a second filter (optional) 111 is positioned intermediate the synthetic turf base 104 and the sub-base 108. The first and second filters 109 and 111 may each comprise a fabric or other material constructed to permit the flow of water from the synthetic turf base 104 to the sub-base 108 and the sub-grade 106, respectively. The first and second filters 109 and 111 are further constructed to substantially prevent the flow of other substances (such as mud and other contaminants) between the synthetic turf base 104, the sub-base 108, and the sub-grade 106, i.e., to prevent such substances from moving downward or from migrating upward through the areas protected by the filters 109 and 111.

Adequate filters 109 and 111 may readily be selected by those skilled in the art. Also, it will be apparent to those skilled in the art that either the first or the second perforated filter 109 or 111, or both, may be eliminated in some applications without departing from the spirit of the present invention.

The present invention is intended, among other uses, for use as a sports playing field, in which case a sub-base 108 atop the sub-grade 106 will most likely be desired to insure adequate support, and drainage to the improved surface 100. However, as will become apparent to those skilled in the art, the present invention is also suitable for use as other surfaces, such as, for example, fire access and parking medians, home yards, parks, and virtually anywhere that a natural or artificial turf surface is desired. In such applications, the sub-grade 106 and sub-base 108 may be modified to suit the particular use to which the invention is being put. Further, in some applications, it may be desirable to eliminate the sub-base 108 altogether. However, it is generally desirable to provide some sub-base 108 (or alternatively, a modified sub-grade 106) upon which the synthetic turf base 104 can be supported.

Figure 3A:
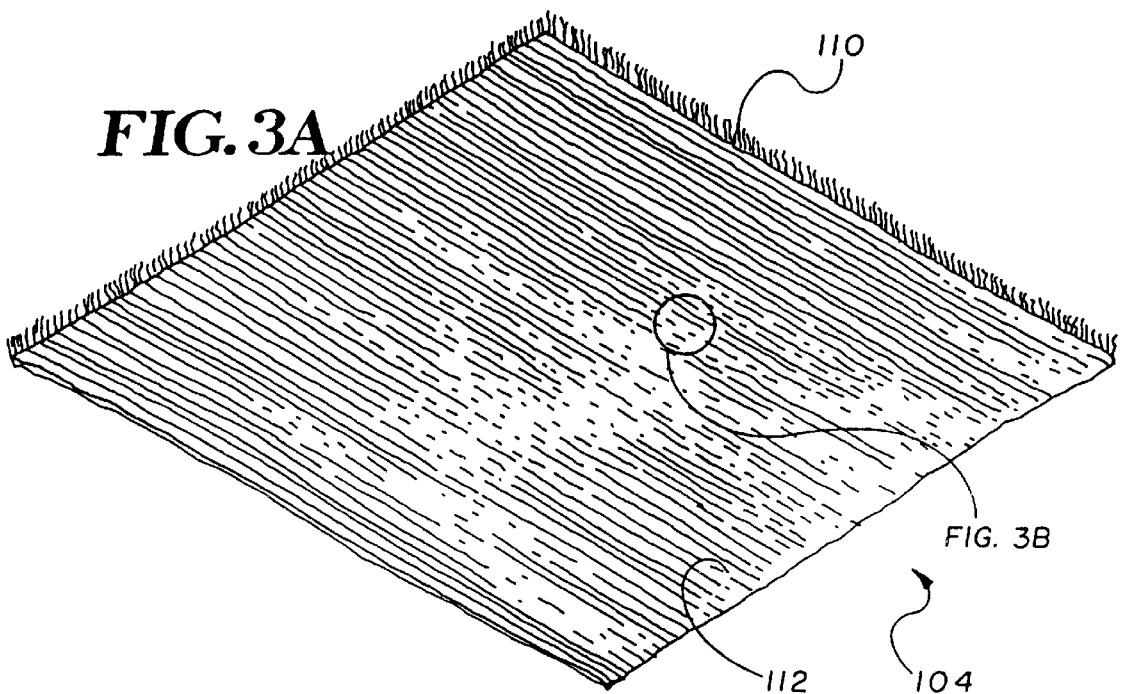
FIG. 3A is a perspective view of one backing material used in the invention.
Figure 3B:
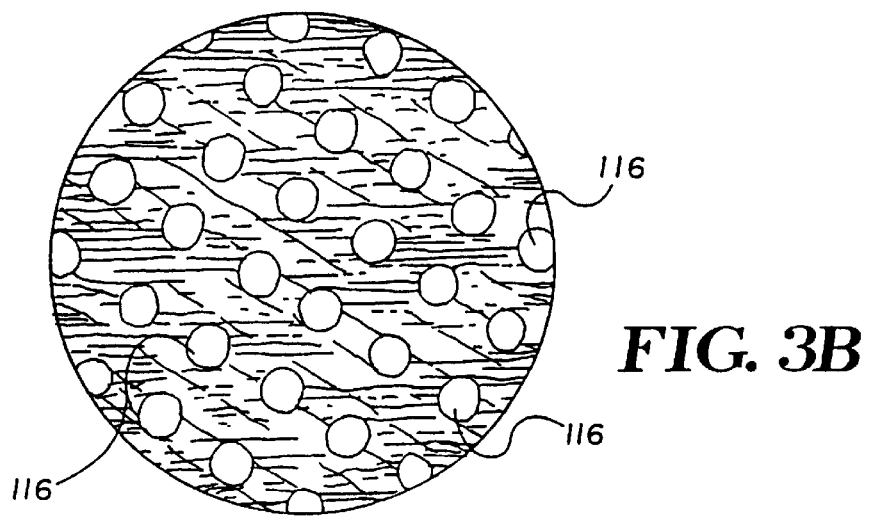
FIG. 3B is an enlarged view of a portion of the backing material of FIG. 3A.
Figure 4B:
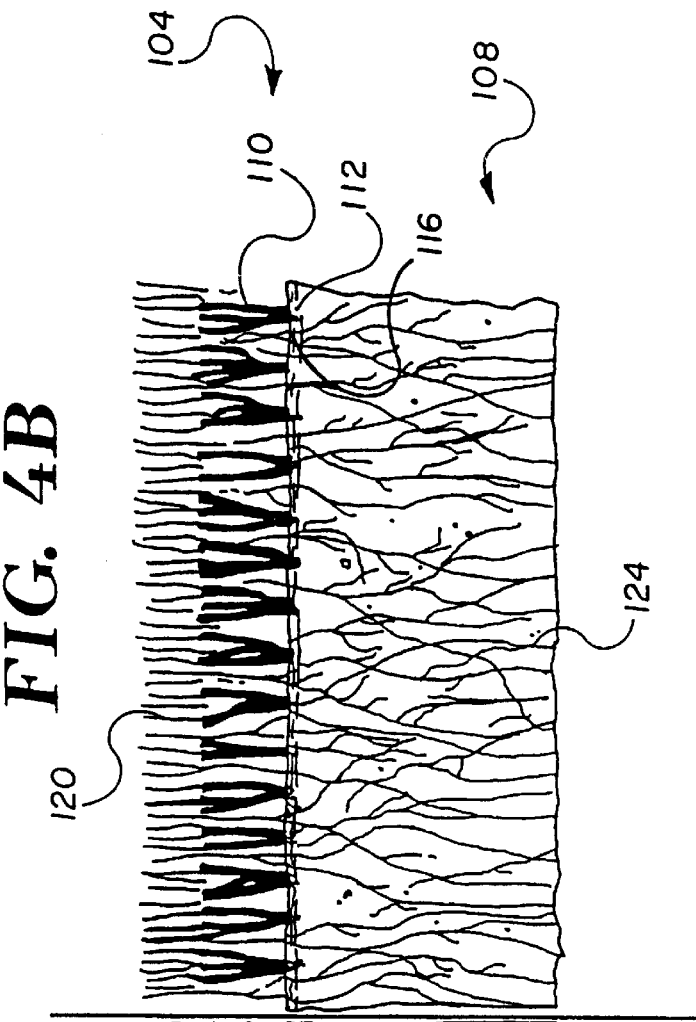
FIGS. 4A and 4B are cross sectional views of an alternative backing material.
Figure 4A:
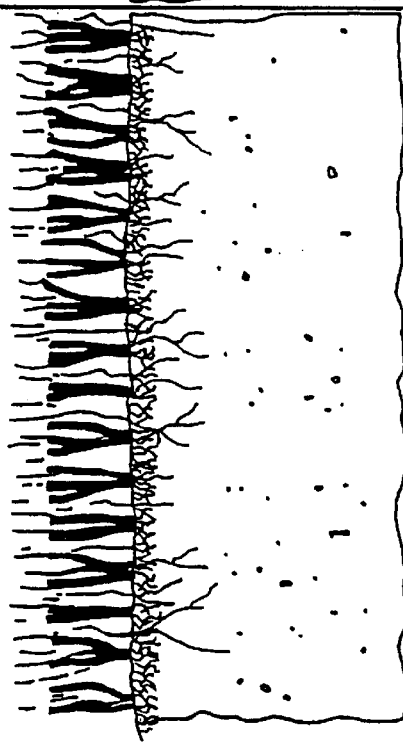

The synthetic turf base 104 includes a multiplicity of synthetic grass fibers 110 that are tufted, or otherwise secured, to a flexible, porous backing 112. The synthetic grass fibers 110 are constructed of a synthetic material that is substantially flexible. The synthetic grass fibers 110 each extend generally upward from one side of the flexible backing 112 and are generally perpendicular to the flexible backing 112. The synthetic grass fibers 110 are of sufficient length that the top portions 114 are spaced upward from the flexible backing 112. As discussed in more detail below, the flexible backing 112 includes a plurality of openings 116 (an example of a perforated backing is shown more clearly in FIGS. 3A and 3B, alternatively where backing may be woven sufficiently coarse that the voids between the strands that form the backing form sufficient openings) that permit water drainage through the backing and into the foundation 102.

The synthetic turf base 104 may be readily constructed by those skilled in the art. Generally, synthetic turf constructions that are used with sand-filled synthetic turf surfaces are suited for use as the synthetic turf base 104 of the present invention. However, it is preferable that the backing material have sufficient openings and that the density of the synthetic fibers be such to allow a dense growth of natural grass throughout the surface.

Figure 5B:
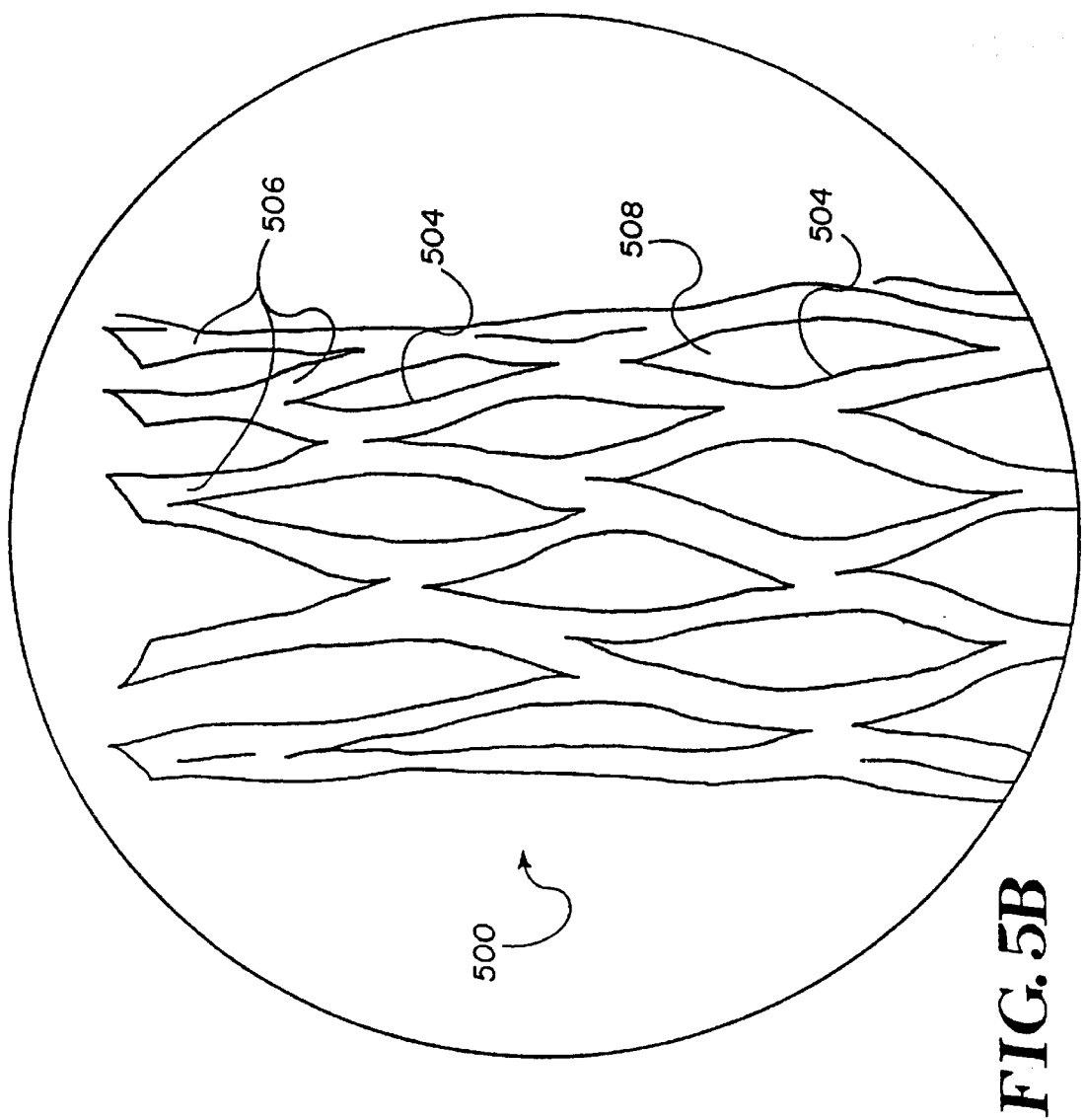
FIGS. 5A and 5B are more detailed illustrations of one embodiment of a synthetic grass fiber used in the invention.

Preferably, the synthetic grass fibers 110 of the synthetic turf base 104 are partially slit, as illustrated in FIG. 5B, or "fibrillated," i.e., include several blade openings 508 through each synthetic grass fiber from the top portions 114 to the flexible backing 112. The openings 508 in the synthetic grass fibers 110 and the backing openings 116 in the flexible backing assist in binding the resulting improved surface 100 together as will be described in more detail below.

The flexible backing 112 is provided for positioning the synthetic grass blades 110 during installation and maintaining the synthetic grass blades 110 in position during use of the improved surface 100. Further, the flexible backing 112 provides structural support to the improved surface 100 by distributing the force of impact upon the improved surface, thereby substantially preventing compaction of the sub-base 108.

In the preferred embodiment of the invention, the synthetic grass fibers 110 are tufted to a flexible backing 112 that is constructed from a woven fabric. The backing 112 is provided for receiving the synthetic grass fibers 110 to hold the synthetic grass fibers in relative position during installation and thereafter.

In the preferred embodiment of the invention, the backing 112 is a mesh having the synthetic grass fibers 110 tufted into the backing. The backing may be formed of a nonbiodegradable material or may be partially or completely formed of biodegradable material selected to deteriorate after installation depending on the application. As discussed above, the backing 112 provides structural support to assist in holding the synthetic grass fibers 110 in position during installation.

As discussed below, it is important that the backing 112 include openings 116 (FIG. 3B) that allow the roots of natural grass plants planted into the synthetic turf base 104 to pass through the backing. Therefore, in the preferred embodiment the backing is formed of a woven material, an example of which is illustrated. Although woven materials allow roots to grow through the spaces between the individual woven fibers, it may be advantageous to form the backing from materials woven at least partially from biodegradable fibers. Using at least a portion of biodegradable fibers in the formation of the backing would allow such fibers to degrade over time, thus creating larger openings through the backing which the roots could grow.

As discussed above, it is also important that the backing support the synthetic grass fibers 110 during installation and also after installation until such time as the fibers become completely supported by a dense growth of natural grass plants within the synthetic turf base. Therefore, in some embodiments it may be advantageous to form the backing from woven fibers having varying degrees of biodegradability. For example, a portion of the fibers can be formed of a material that biodegrades over a first period of time, a second portion of the fibers can be formed of a material that biodegrades over a second period of time, etc. Therefore, the backing 112 may be formed of biodegradable materials that allow a portion of or all of the backing to biodegrade over an extended period of time, thus allowing the synthetic turf base to be fully supported by the growth of the natural grass plants while still allowing the backing material to biodegrade thus increasing the size and occurrence of openings through the backing material in order to allow for a greater growth of the roots of the natural grass plants through the backing.

One example of a biodegradable material for use in this application is urea formaldehyde resin, although those skilled in the art will appreciate that other biodegradable materials could be substituted therefore without departing from the true scope of the subject invention. The backing 112 may be constructed from a variety of materials for positioning the synthetic grass fibers 110 and retaining the synthetic grass fibers in the desired position. As one example, the synthetic grass blades 110 may be tufted to the backing or woven to the backing 112.

In order to assist in holding the weft and warp fibers in the backing together and to help hold the synthetic grass blades in place, it is also advantages to incorporate a fiber fleece into the backing material. The fiber fleece is placed against the underside of the backing matter prior to the tufting of the synthetic grass blades into the backing material. The fiber fleece is then preferably needle punched into the weft and warp fibers of the backing material using a plurality of needles that punch up through the fleece and backing. The needle punching pushes part of the fleece through the weft and warp fibers of the backing thus attaching the fleece and backing together. The synthetic grass blades are then tufted through the fleece and backing. The fleece helps to hold the synthetic grass blades in place creating a "tuft lock" between the synthetic grass blades and the backing. This tuft lock helps to prevent the synthetic grass blades from falling out during transportation or installation of the turf.

In the preferred embodiment, the fiber fleece is formed of a cellulosic biodegradable fiber having a weight of approximately one ounce per square meter. The use of a biodegradable fleece allows the fleece to degrade over time thus allowing a more dense growth of the roots of the natural grass blades through the backing over time.

For ease of installation, it is advantageous that the backing be formed in such a way that it is flexible out of plane, but that it maintain its in-plane stability so that the orientation of the edges of the material remain straight or otherwise fixed. Unfortunately, standard woven materials tend to have little in-plane stability thus the woven materials allow in-plane slippage or movement which allows the edges of the material to become distorted. Such distortions can make it difficult to carefully align adjoining edges of the backing material as they are placed down during installation. Therefore, it is advantageous to form the backing material with some in-plane reinforcement to assist it in maintaining its in-plane stability. One method of increasing the in-plane stability of the backing material is illustrated in FIG. 9.

Figure 9:
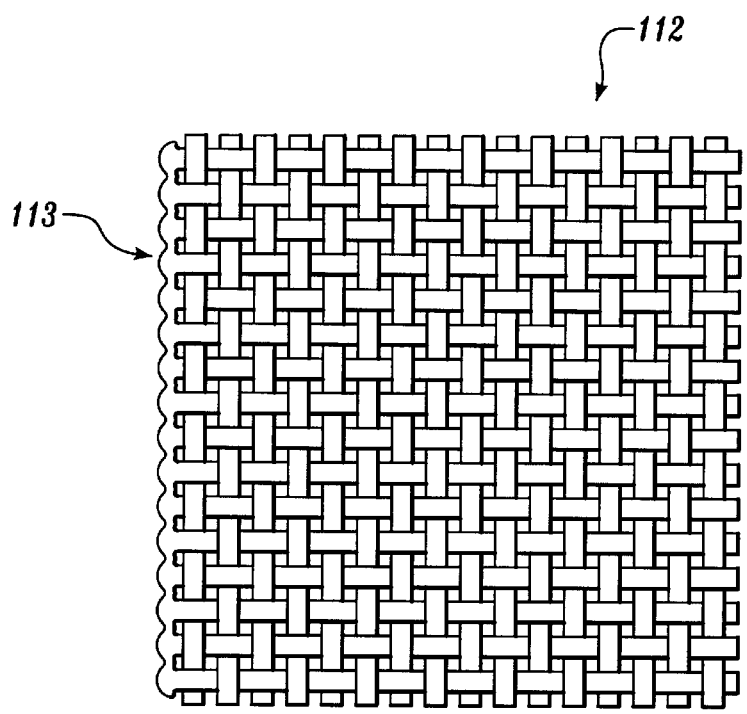
FIG. 9 is a top view of a backing material having a fused edge according to the present invention.

As illustrated in FIG. 9, the edge 113 of the backing 112 is cut using a heated cutter that fuses the ends of the individual fibers forming the backing material together along the cut edge. Fusing the ends of the cut fibers of the backing material provides some in-plane rigidity to the woven backing 112. This in-plane stability in turn assists during installation by helping to maintain the edge 113 of the cut backing material 112 in the predetermined cut shape. In addition, fusing the edges 113 of the backing material 112 during cutting helps to prevent the synthetic grass fibers 110 that are tufted or otherwise fastened into the backing 112 from coming loose from the backing during installation. Various equipment can be used to form the fused cut edge 113, including heated cutting knives, laser cutters, etc.

Figure 5A:
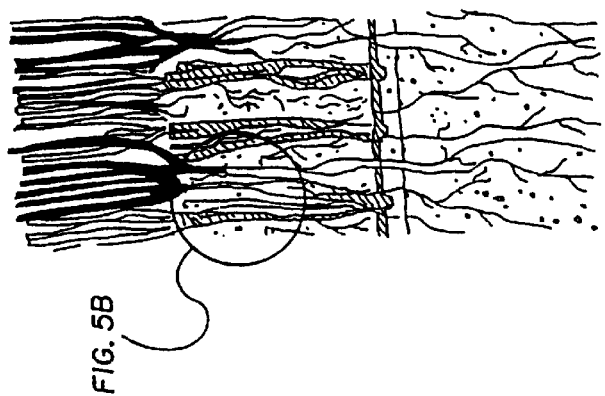

As mentioned above, preferably, the synthetic grass fibers 110 are constructed to include a number of blade openings (splits or fibrillations), as will be described by reference to FIGS. 5A and 5B. Therein, a synthetic grass fiber 500 is constructed from a substantially flexible material, for example, polyolefin or polypropylene. However, the flexible material may be constructed from any material commonly used in the art for making synthetic grass fibers. The flexible material is preferably extruded, or formed using any other technique known in the art, to construct a mesh or web-like structure. So constructed, the flexible material comprises a plurality of strands of material 504 positioned and secured to create a web that defines a plurality of openings 508. Those skilled in the art will appreciate that the synthetic grass fibers illustrated in FIG. 5B is referred to in the art as a fibrillated grass fiber. The fibrillated synthetic grass fiber 500 is preferred to further integrate the improved surface 100, as will be described in more detail below.

Presently, the invention is contemplated using synthetic grass fibers that are approximately 28 millimeters in length and that have a density of approximately 12 synthetic grass fibers per 10 centimeters for certain applications or uses. However, longer or shorter fibers could be used with greater or lesser density depending on the contemplated use and site conditions. As an example, one alternative embodiment that is presently contemplated uses synthetic grass fibers that are 33 millimeters in length and have a density of 13 synthetic grass fibers per 10 centimeters and another uses synthetic grass fibers that are 15 millimeters in length and have a density of 8–10 synthetic grass fibers per 10 centimeters.

Those skilled in the art will recognize that the construction of the synthetic turf base 104 may be further varied without departing from the present inventions. As examples: the synthetic grass blades 110 may be constructed or attached to the backing so that the synthetic grass blades are either "directional" or "nondirectional"; the openings in the synthetic grass blades may be created by twisting several strands or fibers of material to provide a "twisted" synthetic grass blade; the synthetic grass blades can be constructed in a variety of arrangements, e.g., frizzed.

Returning to FIG. 1, the synthetic turf base 104 further includes a surface layer of material 118 positioned atop the flexible backing 112. The surface layer of material 118 preferably fills the synthetic turf base 104 from the flexible backing 112 to a point proximate the top portion 114 of the synthetic grass fibers 110. However, after filling the synthetic turf base 104, the surface layer of material 118 may settle slightly so that the top portions 114 of the synthetic grass fibers 110 extend slightly outward beyond the surface layer of material 118.

The improved surface 100 further includes natural grass 120 that is planted in the surface layer of material 118. The natural grass 120 includes a multiplicity of grass blades 122 each having a crown 123 (FIG. 1B) and roots 124 associated therewith. The natural grass 120 is planted in the surface layer of material 118 so that the crown 123 is positioned just below the top of the surface layer of material 118, as is known in the art. Preferably, the seed that is planted to grow the natural grass is positioned in the surface layer of material at a point where the crown will be located after the surface is established. Generally, it is desirable to position the crown 123 approximately one quarter of one inch below the top of the surface layer of material 118. However, those skilled in the art will appreciate that the crown 123 may be positioned at varying distances from the top of the surface layer of material depending upon a variety of factors, e.g., the type of natural grass 120 and the composition of the surface layer of material 118.

Constructed in this manner, the synthetic grass fibers 110 surround the crowns 123 of the natural grass 120 to provide protection to the crowns 123 which is particularly needed during periods of heavy use and/or poor weather conditions. It will be appreciated by those skilled in the art that in the preferred embodiments of the invention discussed herein, the synthetic grass fibers 110 provide little protection to the grass blades 122. However, it is the intention of the present invention to protect the crown 123 and roots 124 of the natural grass 120 thereby to minimize the time required for the grass blades 122 to re-grow at times when the improved surface 100 is being re-established and to provide a surface with a smoother, grass-like appearance, which may be used during re-establishment. The presence of the natural grass 120 gives the improved surface 100 the comfort, feel, grip, and appearance of a conventional natural turf surface while the presence of the synthetic grass fibers 110 protects the crown 123 and roots 124 to protect the improved surface 100 from deterioration, and the resultant high maintenance costs generally associated with a natural turf surface.

Returning to FIGS. 1 and 5, the roots 124 of the natural grass 120 extend downward through the surface layer of material 118, through the blade openings 508 of the synthetic grass blades 110, and through the backing openings 116 of the flexible backing 112. Providing blade openings 508 through which the roots 124 extend permits the roots 124 to assist in integrating the natural grass 120 with the surface layer of material 118 and the synthetic grass fibers 110. Providing backing openings 116 through which the roots 124 can extend permits the roots 124 to assist in integrating the synthetic turf base 104 with the foundation 102. It is desirable, therefore, to provide blade openings 508 and backing openings 116 adequate in size and number to permit the roots 124 to penetrate from the surface layer of material 118 to the sub-base 108.

One method of providing blade openings 508 of adequate size and number is to provide synthetic grass fibers 500 with a web 506, as discussed above by reference to FIG. 5B. After the roots 124 have grown through the blade openings 508 of the synthetic grass fibers 500 the roots 124 will assist in maintaining the synthetic grass fibers 500 in position thereby integrating the synthetic turf base 104. Other methods for providing blade openings of sufficient size and number to permit the roots 124 to integrate the synthetic turf base will be apparent to those skilled in the art.

As discussed above, one method for providing backing openings 116 of adequate size and number is by forming the backing from another material. The site and number of openings can also be increased by using biodegradable fibers so that after the biodegradable fibers have deteriorated, the size and numbers of openings in the backing will increase to permit additional penetration of the roots 124 from the surface layer of material 118 to the sub-base 108. Those skilled in the art will appreciate that by permitting the roots 124 to penetrate the backing openings 116 of the flexible backing 112, the roots 124 will provide integration of the synthetic turf base 104 to the sub-base 108 beyond any conventional method for fixing the synthetic turf base 104 to the sub-base 108. The roots 124 will interact with the openings to firmly fix the synthetic turf base 104 to the sub-base, thereby preventing any movement across the sub-base or lifting at the edges.

As mentioned briefly above, the sub-base 108 is constructed to provide structural support to the synthetic turf base 104, as with conventional or sand-filled synthetic turf. Unlike conventional or sand-filled synthetic turf, however, the sub-base 108 is further constructed to provide a growing medium for the roots 124 of the natural grass 120.

The surface layer of material 118 may comprise any of a variety of materials for supporting the natural grass 120. In the presently preferred embodiment of the invention, the surface layer of material 118 is a mixture of sand and rubber particles. However, it will be apparent to those skilled in the art that the surface layer of material may comprise any of a variety of materials for supporting of and as a growing medium for the natural grass 120. Further, it is desirable to provide the surface layer of material 118 in sufficient quantity to assist in stabilizing the synthetic turf base 104 and the synthetic grass blades 110. Preferably, the surface layer of material 118 is provided in quantity sufficient to provide approximately five pounds for each square foot of the improved surface 100. However, more or less material may be provided in different applications. Also, it is desired to provide the surface layer of material 118 in sufficient quantity to extend from about one half to one inch from the flexible backing 112, to provide a sufficient growing medium for the roots 124 of the natural grass 120 above the flexible backing 112.

Along these lines, it is to be noted that due to the improved construction of the synthetic turf base 104 in combination with the natural grass 120, the selection of adequate materials for the surface layer of material 118 is not limited as with presently available sand-filled synthetic turf surfaces. As an example, it is generally accepted that only rounded silica sand, a somewhat scarce and expensive sand, is suited for use with sand-filled synthetic turf surfaces. This is because regular sand is abrasive against the users and the synthetic grass blades, and tends to compact preventing surface drainage and creating a harder surface that is less comfortable for the user. However, due to the tendency of the roots 124 of the natural grass 120 of the present invention to hold the surface layer of material 118 in place, regular sand may be used in the improved surface 100 without increased abrasion against the synthetic grass blades 110. Further, the roots 124 of the natural grass 120 provide some resiliency and movement in the synthetic turf base 104 which reduces compaction. Still further, the grass blades 122 of the natural grass 120 protect the user from abrasion against the surface layer of material 118.

Still further, although in some applications it is desirable to mix rubber, or other cushioning particles with the sand, it is generally accepted that rubber particles cannot be mixed with the silica sand (and to some extent also, regular sand) of prior art sand-filled synthetic turf surfaces. This is because water and agitation of the sand will tend to separate the rubber particles from the sand, bringing the rubber particles to the top. However, due to the tendency of the roots 124 of the subject invention to hold the surface layer of material 118 in place, rubber particles may be mixed with the selected surface layer of material 118 to thereby provide a more comfortable playing surface. Also, the addition of rubber particles to the surface layer of material results in less compaction and, therefore, less mechanic aeration of the surface as part of a maintenance program is required.

In many applications, it is advantageous that the top portions 114 do not extend beyond the surface layer of material 118 to achieve the same advantages of the subject invention. Such applications include football or soccer, where surfaces with natural characteristics are desired and where exposed top portions 114 that extend significantly beyond the surface layer of material 118 present a hazard to the players. Whether the top portions 114 extend beyond the surface layer of material 118 or not, the crown 123 and roots 124 are protected by the synthetic grass fibers 110. Since the root system of the natural grass 120 is protected by the synthetic grass blades, even when the blades 122 of the natural grass 120 are destroyed during play, they regrow quickly without the maintenance required for fully natural surfaces, i.e., replanting may not be required since the established roots 124 and crown 123 will regenerate new blades 122.

Another advantage of the preferred embodiment of the present invention is that the grass blades 122 of the natural grass 120 shield sunlight from the synthetic grass fibers 110 of the synthetic turf base 104 substantially reducing the breakdown of the synthetic grass fibers 110 due to ultraviolet light. Further, the incorporation of the natural grass 120 with the synthetic turf base 104 reduces wear of the synthetic turf base 104 since the roots 124 of the natural grass 120 reduce the grinding action of the sand on the synthetic turf. This reduction in wear and ultraviolet light breakdown increases the expected life of the improved surface 100, thereby reducing the long term cost of the surface.

Figure 6:
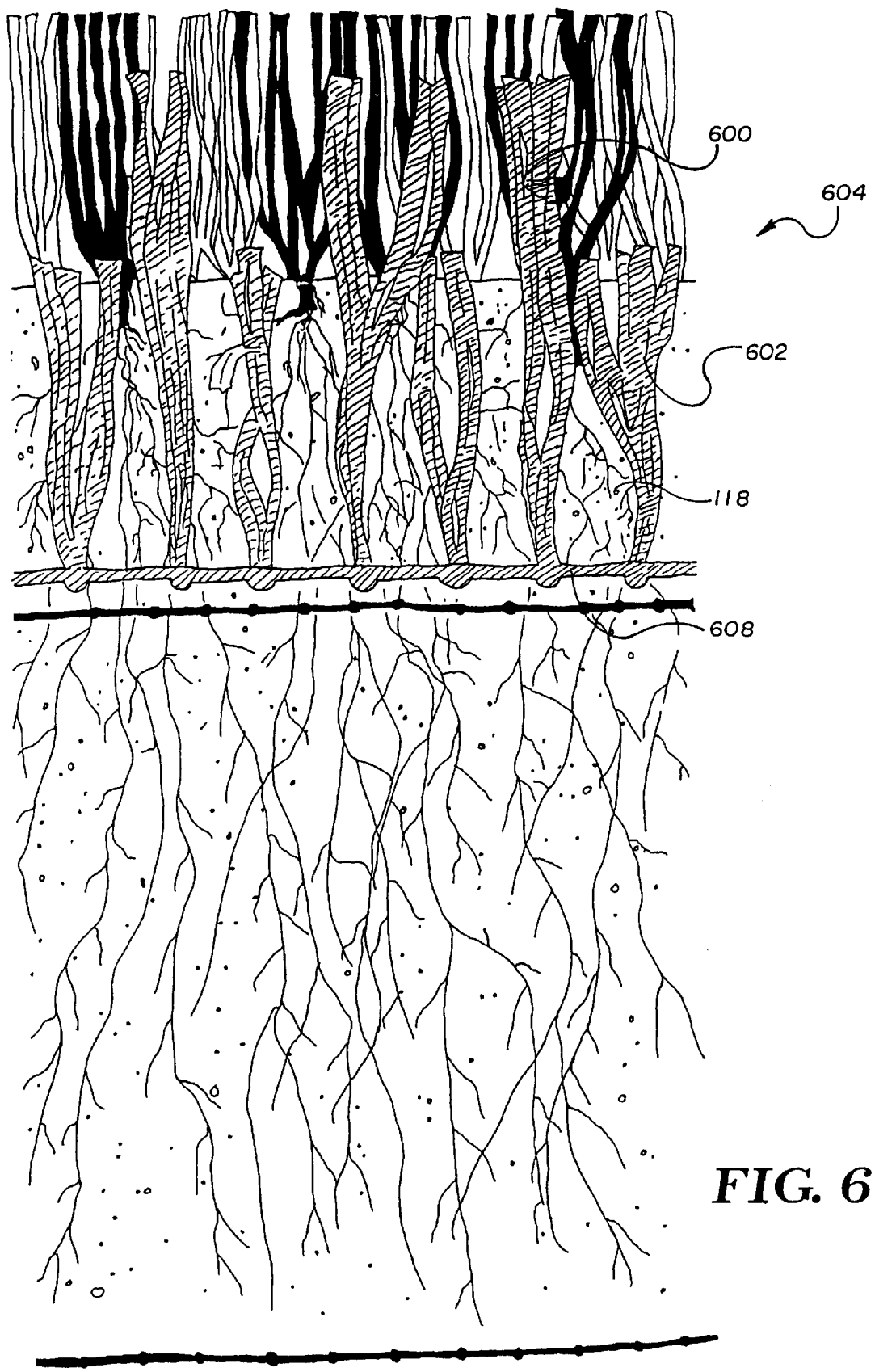
FIG. 6 is a cross sectional view of another embodiment of the invention.

In another embodiment of the invention, the synthetic grass fibers 600 and 602 are constructed from synthetic grass fibers having varying lengths. Referring to FIG. 6, an improved surface 604 is constructed from synthetic grass fibers 600 having a first length and, 602 having a second length secured to a flexible backing 608. As illustrated in FIG. 6, the length of the fibers 600 is greater than the length of the fibers 602 so that the synthetic grass fibers 600 extend outward from the flexible backing 608 a greater distance than the synthetic fibers 602.

The alternate improved surface 604 provides improved characteristics for selected applications. As one example, the improved surface 604 is particularly suited for use as the driving portion of a golf tee because the longer synthetic grass fibers 600 provide greater resistance to golf clubs and to support the golf balls above the top of the improved surface 604 thereby decreasing the damage to the remainder of the improved surface 604, and because the longer synthetic grass fibers 600 provide more uniform appearance after being used. As another example, a selected portion of the first portion 600 of synthetic grass fibers may be provided in a predetermined color for marking lines, logos, etc. Those skilled in the art will appreciate that the synthetic grass fibers of the subject invention may be constructed from a variety of lengths to provide different characteristics to the improved surface, and that two or more different lengths could be used in the same application.

As noted above, it is sometimes desirable to permit a portion, as described by reference to FIG. 6, of the synthetic grass fibers 110 to extend outward beyond the surface layer of material 118. This can provide additional protection to the crown 123, roots 124, and blades 122 of the natural grass 120, thereby possibly improving the durability of the natural grass. The characteristics of the resulting improved surface 100 can be varied by varying the length and density of the top portions 114 that is to be exposed (see FIG. 6). Further, at times when the grass blades 122 of the natural grass 120 are worn short, exposed portions of the synthetic grass fibers 110 of the synthetic turf base 104 and 604 may help to protect the crown 123, roots 124, and blades 122 and helps provide a visually pleasing surface.

Figure 2:
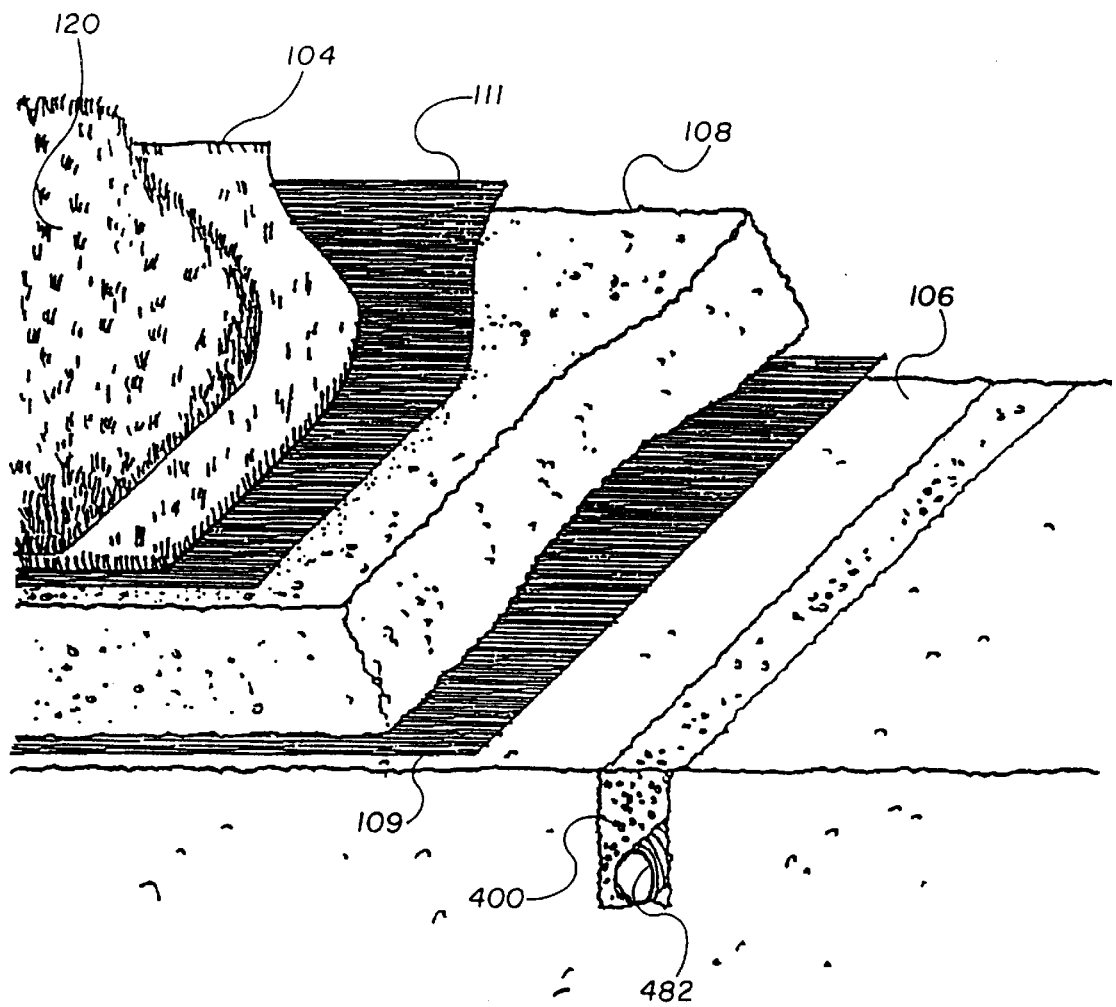
FIG. 2 is a partial cutaway view showing the construction of the surface of FIG. 1A.

Referring to FIG. 2, a description of a method of constructing one embodiment of the improved surface 100 illustrated in FIG. 1 will be described. Initially, the sub-grade 106 is prepared by forming trenches 400 and adding drainage piping 482. Thereafter, the second perforated filter 109 is added atop the sub-grade 106, if desired, and is followed by formation of the sub-base 108. If the first perforated filter 111 is desired, it is placed upon the sub-base 108 followed by the synthetic turf base 104, including the surface layer of material 118. It should be noted by those skilled in the art that the filters 109 and 111 are optional and one or the other or both may not be used depending upon the application. After the synthetic turf base 104 has been installed, the natural grass 120 (FIG. 1A) is planted so that the crown 123 and roots 124 can form, as described above.

One advantageous way of installing the improved surface 100 is to use preseeded panels. In accordance with this method, the synthetic turf base is manufactured in panels of a size readily stored, transported, and installed, e.g., of approximately 16 inches by 48 inches. During manufacturing, the synthetic turf base is filled with a surface layer of material which is seeded to create a seeded panel.

Preferably, the seeded panel is manufactured by combining a binding material with the surface layer of material to stabilize the components of the seeded panel during manufacture, transportation, and installation. Preferably, the binding material is selected as a material that can be readily decomposed after the seeded panels are installed, as will be described in more detail below. A presently preferred binding material that may be used is a biodegradable material. Other binding materials, such as degradable materials may also be used, as will become apparent to those skilled in the art.

The manufacture of the seeded panel may be continued by combining the binding material with the surface layer of material in a variety of ways. As an example, the binding material may be combined with the surface layer of material in a substantially dry form, combined with a sufficient amount of water or other activating agent, and dried to create a substantially cohesive structure. As an alternative, the surface layer of material may be combined with a binding material in a substantially liquid form, and thereafter dried to create a substantially cohesive structure.

In either method, it is desired to initially provide only that amount of surface layer of material that is desired intermediate the seeds and the backing of the synthetic turf base. To complete the manufacture of the seeded panel, the seed may be provided and the process completed to add that additional amount of surface layer of material desired intermediate the seed and the top of the seeded panel. The additional amount of surface layer of material may be stabilized with a binding material, as described above. Thus produced, the seeded panels may be readily stacked and/or otherwise stored, prior to shipping and installation. Those skilled in the art can readily identify favorable storage conditions.

The seeded panels constructed in this manner may be produced in a controlled production environment thereby assuring a consistently high quality of product with the exact specification of ingredients required for each application. Various steps required to build this surface at the site may be completed in the controlled production environment thereby greatly reducing installation time at the site. Additionally, each panel manufactured can be substantially identical and, therefore, the installed surface will not be subject to variation that may exist as a result of variation between local installers, local materials, and weather conditions. Another advantage is that the seeded panels may be installed under most weather conditions. The time for installation is significantly less than that required for installation of the improved surface when constructed without using seeded panels. Considerable cost-saving in the handling and installation of the material is also achieved.

Figure 7A:
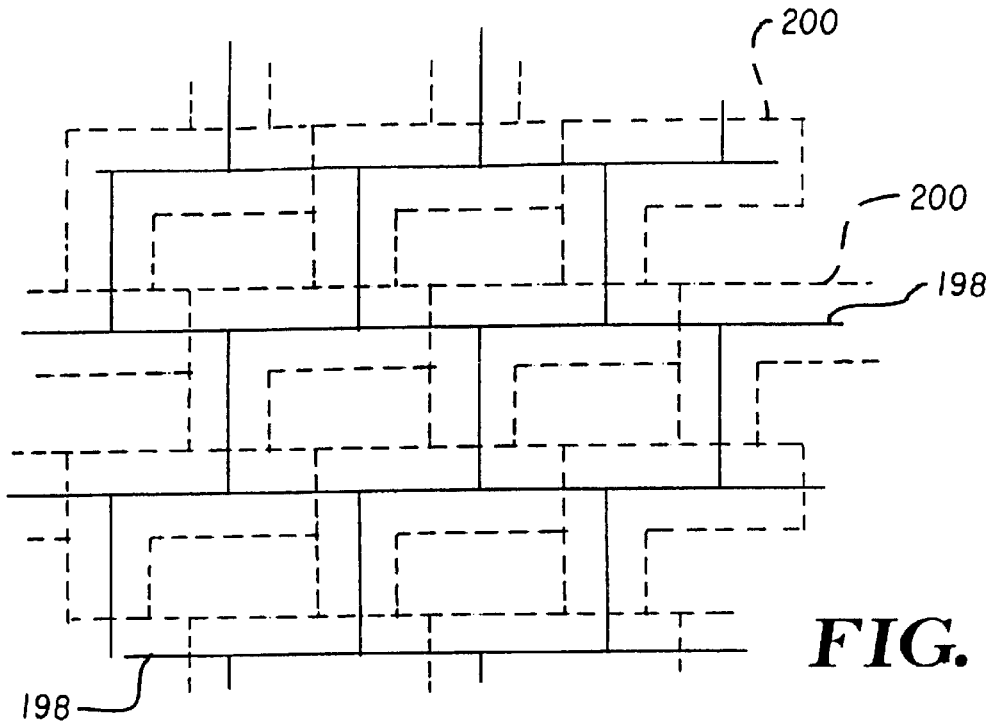
FIGS. 7A and 7B are illustrations of seeded panels during installation according to the invention.
Figure 7B:
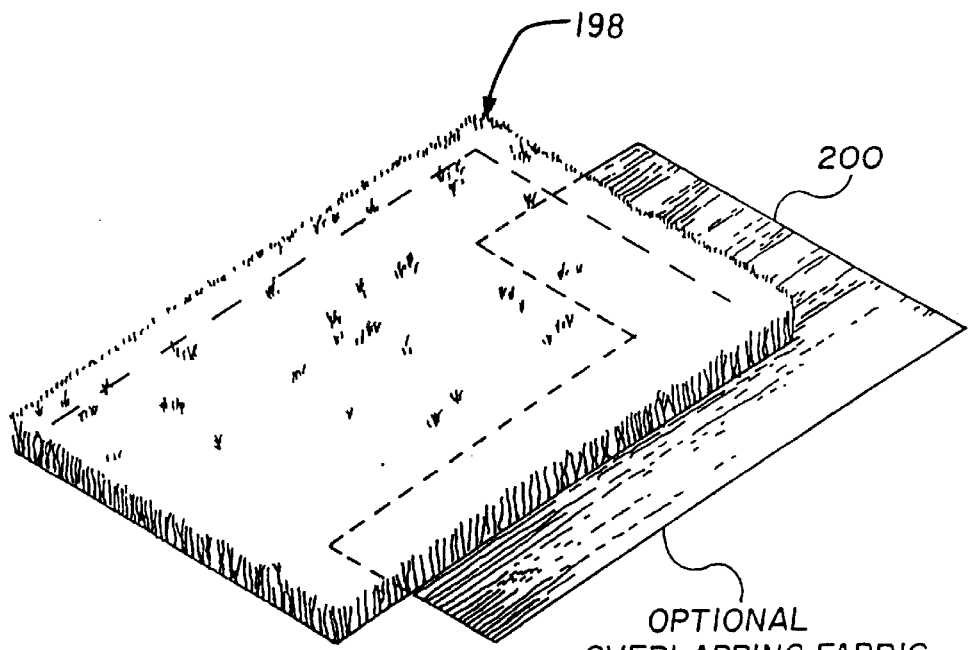

As illustrated in FIG. 7, it is desirable to reinforce the edges of the panels 198 or synthetic turf base 104 as they are installed. In the embodiment illustrated in FIGS. 7A and 7B, the edges between the various panels 198 are reinforced by first applying a mesh-type material 200 upon the foundation prior to placing the panels 198. Also as illustrated in FIGS. 7A and 7B, the mesh material is provided in an L shape such that the mesh-type materials fit together so that the mesh-type material 200 underlies all of the edges of the adjoining panels 198. The mesh-type material 200 is provided so that the roots of the natural grass plants grow through the panels 198 and down through the mesh-type material 200 and into the underlying foundation. Thus, the roots of the natural grass plants interlock the edges of the panels 198 with the mesh-type material 200 and the underlying foundation. The interlocking of the panels, mesh-type material 200, and foundation help to ensure that the edges of the panels 198 are efficient and reliably joined together thus preventing possible movement of one panel with respect to another or possible lifting of the edges of the panels.

Figures 8A, 8B:
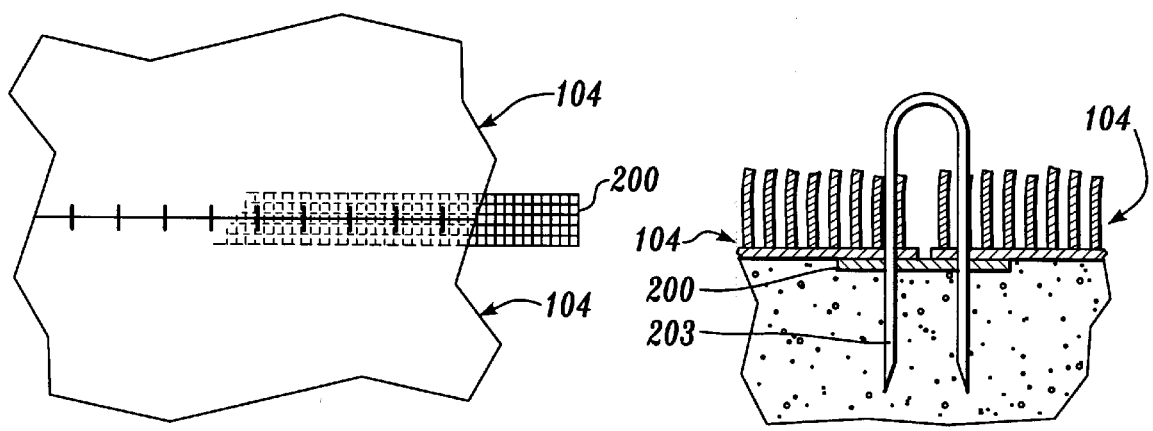
FIGS. 8A and 8B are a plan view and a cross sectional view, respectively, of a portion of the installation of one embodiment of the invention.

FIGS. 8A and 8B illustrate a second embodiment of a mesh-type material that may be used to reinforce the edges of the adjoining synthetic turf bases 104. As illustrated in FIGS. 8A and 8B, the mesh-type material 200 is placed underneath the adjoining edges of two synthetic turf base pieces. In the embodiment illustrated in FIGS. 8A and 8B, the mesh-type material 200 is shown with respect to the use of long narrow strips of material that are used in installations using long, large adjoining pieces of synthetic turf base 104. However, narrow strips of mesh-type material 200 such as that shown in FIGS. 8A and 8B could also be utilized in the installation of the panels 198 as opposed to the L shaped mesh configuration illustrated in FIGS. 7A and 7B.

The mesh-type material 200 illustrated in FIGS. 8A and 8B is installed underneath the edges of the two adjoining synthetic turf base pieces 104. In order to further ensure that the edges of the synthetic turf base pieces do not shift or become otherwise displaced during completion of the installation, it is desirable to anchor the edges of the synthetic turf base pieces and mesh-type material 200. In the embodiment illustrated in FIGS. 8A and 8B, U-shaped anchors 203 are inserted into the installed synthetic turf base 104 such that the opposing points of the U-shaped anchors extend through the opposing edges of the synthetic turf base pieces, through the mesh-type material 200 and into the underlying foundation. The U-shaped anchors 203 are left in position during the subsequent filling of the synthetic turf base with a growth medium and removed prior to seeding.

Figure 11:
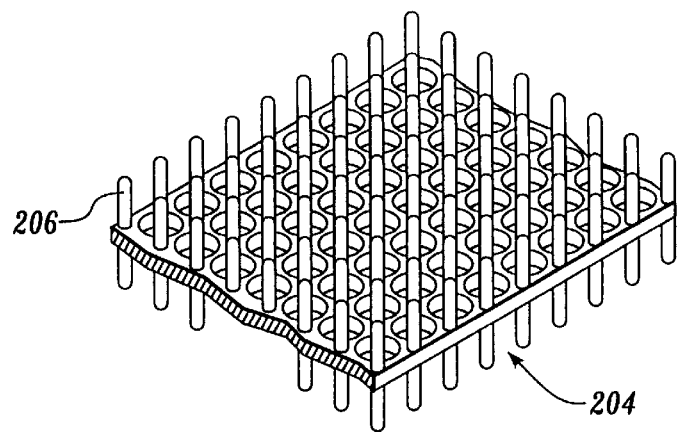
FIGS. 11 and 12 are a perspective view and a cross sectional view, respectively, of an alternate embodiment of a portion of the installation of one embodiment of the invention.
Figure 12:
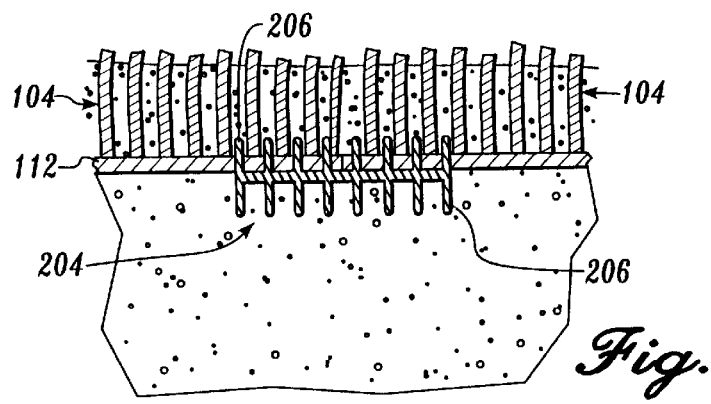

Another embodiment of a mesh-type material 204 is illustrated in FIGS. 11 and 12. The mesh-type material 204 illustrated in FIGS. 11 and 12 is fabricated from a rubber, plastic, or other material. The mesh-type material 204 includes a plurality of spikes or other protrusions 206 that extend either upward from the upper surface of the material, downward from the lower surface of the material, or both upward and downward from the upper and lower surfaces of the material, respectively, depending on the application. The area between the protrusions 206 is left open to allow the roots of the natural grass plants to grow through the mesh-type material 204 as discussed above.

As illustrated in FIG. 11, when installed, the protrusions 206 extend downward into the foundation and upward through the backing material 112 of the synthetic turf base 104. The protrusions 206 thus help to anchor the mesh-type material 204 in the proper position on the foundation and also help the mesh-type material 204 to engage and stabilize the edges of the synthetic turf base 104. The embodiment illustrated in FIGS. 11 and 12 may provide additional stability to the installation during subsequent filling of the synthetic turf base 104 with growth medium and seeding. In addition, the embodiment of the mesh-type material 204 may also help to eliminate the need for the use of the U-shaped anchors 203 discussed above.

Figure 10:
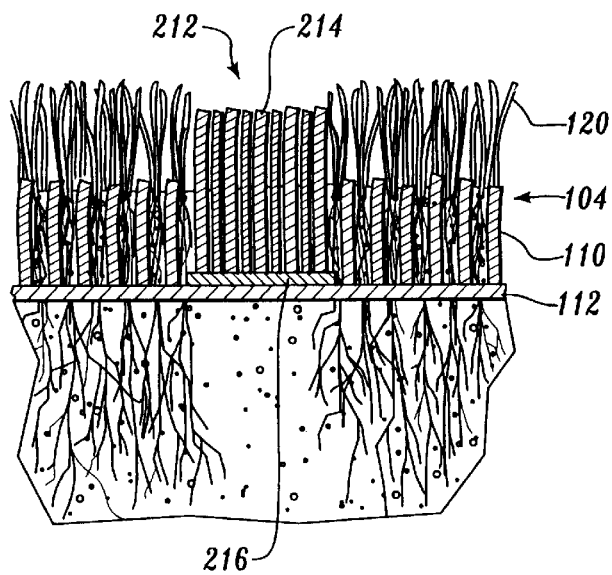
FIG. 10 is a cross sectional view of another embodiment of the invention incorporating a built in line indicator.

As discussed briefly in the background section, one of the problems associated with prior playing surfaces used for football, soccer, and some other sports is the application of boundary indicators such as boundary lines and yardage lines. FIG. 10 illustrates an embodiment of the invention that incorporates built-in boundary indicators that help to eliminate the problems associated with prior boundary indicators. As illustrated and discussed above, the synthetic turf base 104 includes a porous backing 112 and a plurality of upwardly extending synthetic grass fibers 110. In the embodiment illustrated in FIG. 10, the synthetic turf base 104 includes an indicator portion 212 that is configured to provide boundary indications, line indications, etc. In the preferred embodiment, the indicator portion 212 is formed by forming a portion of the synthetic turf base 104 without any synthetic turf fibers 110. The indicator portion 212 is then formed separately by tufting synthetic fibers 214 into a backing material 216.

Unlike the synthetic turf base 104, it is advantageous to form the backing material 216 from a material that is impervious to the root growth of natural grass plants to help prevent grass from growing into the indicator portion. It is also advantageous to form the synthetic grass fibers 214 of a sufficient length that they extend upward from the surface of the backing material 112 such that the tops of the fibers 214 are at approximately the same height as the top of the mowed natural grass blades 120 growing in the synthetic turf base 104.

In some applications, it is also advantageous to form the indicator portion 212 with a much more dense distribution of synthetic grass fibers 214 than that used in the surrounding synthetic turf base 104. Forming the indicator portion 212 with a sufficiently dense distribution of synthetic grass fibers 214 helps to prevent the natural grass from growing into or otherwise becoming part of the indicator portion 212. It is also advantageous to form the backing material 216 with a type of herbicide included in the backing material to prevent natural grass from growing into the indicator portion 212. It is further advantageous to form the imitation fibers 214 of a color that contrasts with the natural color of the grass thus allowing the indicator portion 212 to be easily observed by players and onlookers.

The indicator portion 212 may be attached to the backing material 112 by applying an adhesive between the backing material 216 and the backing material 112. Alternatively, the indicator portion 212 may be sewn or otherwise attached to the backing material 112. In yet other embodiments, the synthetic fibers 214 may be tufted directly into the backing material 112. However, in such applications it is advantageous that the backing material 112 in the region of the indicator portion 212 be coated with an impervious material either before or after the tufting of the imitation fibers 214 to prevent grass growth through the backing in the region of the indicator portion 212.

In addition to forming boundary lines, etc., as described above, graphical indicators such as high school or college logos, names, etc., may also be formed in the artificial turf base 104 in a manner similar to that described above with respect to the indicator portion 212.

Forming the indicators such as boundary lines, etc., through the use of longer synthetic fibers 214 having different colors, etc., reduces several of the problems associated with prior art playing surfaces. Indicators formed in accordance with the invention provide a long term indication and require minimal if any maintenance. In addition, such indicators do not provide a slippery or hard surface as produced by repeatedly painting indicators directly upon an artificial or natural playing surface.

It will be apparent to those skilled in the art that although several preferred embodiments of the invention have been described in detail herein, many modifications and variations may be provided without departing from the true scope and spirit of the invention. Accordingly, the spirit and scope of the invention is not limited except as by the scope of the claims.

The embodiments of the invention in which an exclusive property or privilege is claimed are defined as follows:

1. A playing surface comprising:
   (a) a foundation;
   (b) a synthetic grass turf located on top of the foundation and including a backing material and a plurality of synthetic grass fibers extending generally vertically upward from the backing material, the synthetic grass fibers being formed of at least a first group of fibers having a first length and a second group of fibers having a second length longer than the first length so that the second group of fibers extends upward from the backing material a greater distance than the first group of fibers;
   (c) a layer of growth medium disposed in the synthetic grass turf to a depth sufficient to substantially fill the synthetic grass turf to the top of the first group of fibers; and
   (d) natural grass plants, having grass blades, crowns and roots disposed in the growth medium, the roots extending downward through the growth medium, the backing material, and into the foundation, the crowns being located slightly below the top of the first group of fibers and the grass blades extending upwardly above the top of the first group of fibers and slightly above, the second group of fibers.

2. The playing surface of claim 1, wherein the first group of fibers and second group of fibers are approximately uniformly distributed throughout the synthetic grass turf.

3. The playing surface of claim 1, wherein the second group of fibers is formed of a material having a color that contrasts with a color of the natural grass plants.

4. The playing surface of claim 1, wherein the second group of fibers forms a visual indicator.

5. The playing surface of claim 1, wherein the backing material in the region of the second group of fibers is formed of a root impervious material.

6. The playing surface of claim 1, wherein the second group of fibers are attached to a second backing material that is in turn attached to the backing material of the synthetic grass turf.

7. The playing surface of claim 1, wherein the backing material in the region of the second group of fibers incorporates a herbicide that helps prevent the natural grass plants from growing into the region of the second group of fibers.

8. The playing surface of claim 1, wherein the backing material is formed of woven strands of material and wherein the ends of the strands of material along the edges of the backing material are fused together.

9. The playing surface of claim 1, wherein the backing material is formed at least partially of different biodegradable materials that degrade at different rates to produce a greater degree of porosity in the backing material over time.

10. A method of forming a playing surface comprising:
(a) forming a foundation;
(b) placing more than one piece of synthetic grass turf on the foundation, the synthetic grass turf having a plurality of synthetic grass fibers extending generally vertically upward from a backing material;
(c) placing a porous mesh material on the foundation between the foundation and the backing material of said synthetic grass turf so that the mesh material underlies adjoining edges of said pieces of synthetic grass turf;
(d) filling the synthetic grass turf with a growth medium so that a top of the growth medium is approximately at the same height as a top of the synthetic grass fibers; and
(e) sowing natural grass on top of the growth medium so that roots of the natural grass plants extend downward through the synthetic grass turf, through the mesh material, and into the foundation and so that blades of the natural grass plants extend upward from a top of the growth medium to form a playing surface of natural grass.

11. The method of claim 10, further comprising placing a porous mesh material having protrusions extending from at least one side of the mesh material on the foundation between the foundation and the backing material.

12. The method of claim 11, further comprising placing a porous mesh material having protrusions extending from both sides of the mesh material on the foundation between the foundation and the backing material so that the protrusions extending from one side of the mesh material extend into the foundation and so that the protrusions on the opposite side of the mesh material extend into the backing material.

13. The method of claim 10, further comprising forming the synthetic grass turf of a plurality of synthetic grass fibers extending generally vertically upward from the backing material such that the synthetic grass fibers in one or more portions of the synthetic grass turf are longer and extend generally vertically upward from the backing material farther than the synthetic grass fibers in the rest of the synthetic grass turf so that the longer synthetic grass fibers form a visual indicator and wherein the filling step comprises filling the synthetic grass turf with a growth medium so that the top of the growth medium is approximately at the same height as the top of the shorter synthetic grass fibers.

14. The method of claim 10, further comprising forming the backing material from a woven material and wherein the edges of individual strands of the woven material are fused together at one or more edges of each piece of synthetic grass turf to provide some in-plane stability to the backing material.

15. A playing surface comprising:
(a) a foundation;
(b) a plurality of pieces of synthetic grass turf located on top of the foundation so that the edges of the pieces of synthetic turf are placed adjacent each other to form a continuous surface of synthetic grass turf, the synthetic grass turf including a backing material and a plurality of synthetic grass fibers extending generally vertically upward from the backing material;
(c) a porous mesh material located between the foundation and the synthetic grass turf in the region of the edges of the synthetic grass turf so that the mesh material underlies the adjoining edges of the pieces of synthetic grass turf;
(d) a layer of growth medium disposed in the synthetic grass turf to a depth sufficient to substantially fill the synthetic grass turf to the top of the synthetic grass fibers; and
(e) natural grass, including blades and roots, planted in said growth medium so that the roots extend downward through the growth medium, the backing material, and into the foundation and so that the blades extend upward from the top of the layer of growth medium to form a playing surface.

16. The playing surface of claim 15, further comprising boundary indicators, the boundary indicators being formed of synthetic grass fibers extending generally vertically upward from the backing material above a top of the layer of growth medium a sufficient distance so that the tops of the synthetic grass fibers forming the indicators form a visual indicator within the natural grass.

17. The playing surface of claim 16, wherein the artificial grass fibers forming the indicators are of a color that contrasts with a color of the natural grass.

18. The playing surface of claim 16, wherein the backing material in the region of the indicators is root impermeable.

19. The playing surface of claim 15, wherein the backing material is formed at least partially of different biodegradable materials that degrade at different rates to produce a greater degree of porosity in the backing material over time.

20. A playing surface comprising:
(a) a foundation;
(b) a synthetic grass turf located on top of the foundation and including a backing material, a fleece material, and a plurality of synthetic grass fibers, the fleece material being located on the underside of the backing material and being attached to the underside of the backing material, the synthetic grass fibers extending through the backing material and the fleece material and extending generally vertically upward from the backing material in approximately the same direction;

(c) a layer of growth medium disposed in the synthetic grass turf to a depth sufficient to approximately fill the synthetic grass turf to a top of the synthetic grass fibers; and (d) natural grass plants, having grass blades, crowns, and roots disposed in the growth medium, the roots extending downward through the growth medium, the backing material, the fleece material, and into the foundation, the crowns being located at or slightly below the top of the synthetic grass fibers and the grass blades extending upward above the top of the synthetic grass fibers to form a natural grass playing surface.

21. The playing surface of claim 20, wherein the synthetic grass turf includes synthetic grass fibers formed of at least a first group of fibers having a first length and a second group of fibers having a second length longer than the first length so that the second group of fibers extends upward from the backing material a greater distance than the first group of fibers and so that the layer of growth medium is disposed in the synthetic grass turf to a depth sufficient to approximately fill the synthetic grass turf to the top of the first group of fibers and so that the crowns of the natural grass plants are located at or slightly below the top of the first group of fibers and the grass blades extend upward above the top of the first group of fibers and slightly above the top of the second group of fibers.

22. The playing surface of claim 21, wherein the first group of fibers and second group of fibers are approximately uniformly distributed throughout the synthetic grass turf.

23. The playing surface of claim 21, wherein the second group of fibers is grouped together in a prespecified path to form a visual indicator and wherein the second group of fibers is formed of a material having a color that contrasts with the color of the natural grass plants.

24. A grass playing surface comprising:

(a) a foundation, (b) an artificial grass turf located on top of the foundation, the artificial grass turf having generally vertically upright fibers mounted in a porous backing material;

(c) a layer of growth medium disposed in the artificial grass turf to a depth at least approaching the top of the fibers of the artificial grass turf; and (d) natural grass plants having grass blades, crowns and roots, the grass plants disposed in the growth medium, the roots extending downwardly through the growth medium, the artificial grass turf, and into the foundation, the crowns being located slightly below the top of the artificial fibers and the grass blades extending upwardly above the top of the fibers forming a playing surface of substantially natural grass.

25. A grass playing surface comprising:

(a) a foundation;

(b) an artificial grass turf located on top of the foundation, the artificial grass turf having generally vertically upright fibers mounted in a porous backing material, the fibers having at least one free end and extending upward in the same general direction;

(c) a layer of growth medium disposed in the artificial grass turf to a depth at least approaching the top of the fibers of the artificial grass turf; and (d) natural grass plants having grass blades, crowns and roots, disposed in the growth medium, the roots extending downwardly through the growth medium, the artificial grass turf and into the foundation, the blades extending upwardly above the top of the fibers forming a playing surface of substantially natural grass.

* * * * *

UNITED STATES PATENT AND TRADEMARK OFFICE
CERTIFICATE OF CORRECTION

PATENT NO. : 5,850,708 C1
DATED : September 25, 2001
INVENTOR(S) : Jerry G. Bergevin It is certified that error appears in the above-identified patent and that said Letters Patent is hereby corrected as shown below:

Column 2,
Line 15, reads "upward form a ..." and should read -- upward from a --.

Column 3,
Line 2, reads "the porous backing material the backing material having openings" and should read -- the porous backing material having openings --.

Column 4,
Line 2, reads "the porous backing material the backing material having openings" and should read -- the porous backing material having openings --.

Signed and Sealed this

Tenth Day of September, 2002

Attest:

Attesting Officer

JAMES E. ROGAN
*Director of the United States Patent and Trademark Office*

US005850708B1

(12) REEXAMINATION CERTIFICATE (4447th)
United States Patent
Bergevin

(10) Number: US 5,850,708 C1
(45) Certificate Issued: Sep. 25, 2001

(54) SURFACE FOR SPORTS AND OTHER USES

(75) Inventor: Jerry G. Bergevin, Edmonds, WA (US)

(73) Assignee: Turf Stabilization Technologies, Inc., Cincinnati, OH (US)

Reexamination Request:
No. 90/005,531, Oct. 15, 1999

Reexamination Certificate for:
Patent No.: 5,850,708
Issued: Dec. 22, 1998
Appl. No.: 08/744,758
Filed: Nov. 6, 1996

( * ) Notice: This patent is subject to a terminal disclaimer.

Related U.S. Application Data

(63) Continuation-in-part of application No. 08/334,414, filed on Nov. 4, 1994, now Pat. No. 5,586,408, which is a continuation of application No. 08/078,624, filed on Jun. 17, 1993, now abandoned, which is a continuation-in-part of application No. 07/902,147, filed on Jun. 22, 1992, now abandoned.

(51) Int. Cl.[7] ............................. A01C 29/00; A01C 1/04; A01B 29/00; A01N 3/00
(52) U.S. Cl. .......................... 47/1.01 R; 47/58.1; 47/56; 428/17
(58) Field of Search .................................. 47/1.01 R, 56, 47/58.1; 161/21; 273/29; 428/17; 272/3

(56) References Cited

U.S. PATENT DOCUMENTS

| | | | | |
|---|---|---|---|---|
| 4,396,653 | * | 8/1983 | Tomarin | 428/17 |
| 4,735,825 | * | 4/1988 | Friedrich | 427/202 |
| 4,942,833 | * | 7/1990 | Hill et al. | 111/121 |

FOREIGN PATENT DOCUMENTS

0062738 * 5/1988 (EP).
49-123822 * 11/1974 (JP).
51-33472 * 8/1976 (JP).
53-12742 * 6/1977 (JP).
151813 * 8/1984 (JP).
4-24432 * 2/1992 (JP).

OTHER PUBLICATIONS

Notts Sport, *Grass Reinforcement VHAF*, pages from website.
Notts Sport, *Landscape VHAF Erosion Control Fabrics*, double–sided, single–page brochure, 1988.
Notts Sport, *Heavily Worn Golf Courses Cry out For Repairs*, single page brochure, 1988.
Notts Sport, *VHAF Winter Games Pitches—Erosion Control Fabrics*, double–sided, single–page brochure, 1988.
Notts Sports, *Golf Courses—VHAF Erosion Control Fabrics*, double–sided, single–page brochure, 1988.
Notts Sports, *Grass Reinforcement VHAF Installation Instructions*, 1990.

* cited by examiner

*Primary Examiner*—Peter M. Poon

(57) ABSTRACT

An improved playing surface including a synthetic turf base positioned atop a foundation. The synthetic turf base includes synthetic grass fibers secured to a backing material. The synthetic turf base also includes a surface layer of growth medium intermixed with the synthetic grass fibers. Natural grass is planted in the surface layer of growth medium wherein the natural grass includes natural grass blades and roots. The backing is provided with perforations or openings sufficient in number to permit the roots of the natural grass to extend through the backing into the sub-base of the foundation. The improved playing surface may include synthetic grass fibers of varying lengths, longer synthetic grass fibers can be formed of contrasting colors in order to provide line and boundary indicators. A mesh-type material is placed underneath the adjoining layers of backing material in order to reinforce the interface between separate sections of backing material.

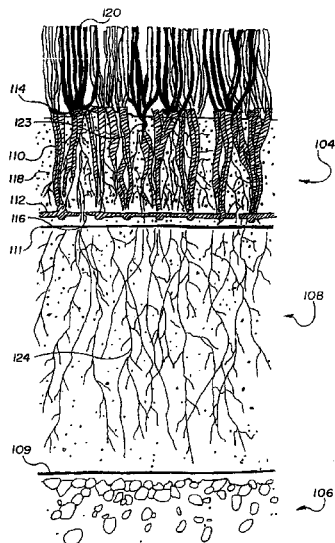

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 20–23 is confirmed.

Claims 1, 10, 11, 15, 24 and 25 are determined to be patentable as amended.

Claims 2–9, 12–14 and 16–19, dependent on an amended claim, are determined to be patentable.

1. A playing surface comprising:
   (a) a foundation;
   (b) a synthetic grass turf located on top of the foundation and including a backing material and a plurality of synthetic grass fibers extending generally vertically upward from the backing material, the synthetic grass fibers being formed of at least a first group of fibers having a first length and a second group of fibers having a second length longer than the first length so that the second group of fibers extends upward from the backing material a greater distance than the first group of fibers, *the first group of fibers being about two thirds of the length of the second group of fibers*;
   (c) a layer of growth medium disposed in the synthetic grass turf to a depth sufficient to substantially fill the synthetic grass turf to the top of the first group of fibers, *with the second group of fibers extending above the top of the layer*; and
   (d) natural grass plants, having grass blades, crowns and roots disposed in the growth medium, the roots extending downward through the growth medium, the backing material, and into the foundation, the crowns being located slightly below the top of the first group of fibers and the grass blades extending upwardly above the top of the first group of fibers and slightly above, the second group of fibers.

10. A method of forming a playing surface comprising:
    (a) forming a foundation;
    (b) placing more than one piece of synthetic grass turf on the foundation, the synthetic grass turf having a plurality of synthetic grass fibers extending generally vertically upward from a backing material, *the backing material having openings therethrough, the openings dispersed and distributed substantially across the entire surface area of the backing material to permit the majority of the roots of natural grass plants to grow therethrough*;
    (c) placing a porous mesh material on the foundation between the foundation and the backing material of said synthetic grass turf so that the mesh material underlies adjoining edges of said pieces of synthetic grass turf;
    (d) filling the synthetic grass turf with a growth medium so that a top of the growth medium is approximately at the same height as a top of the synthetic grass fibers; and
    (e) sowing natural grass on top of the growth medium so that roots of the natural grass plants extend downward through the synthetic grass turf, through the mesh material, and into the foundation and so that blades of the natural grass plants extend upward from a top of the growth medium to form a playing surface of natural grass.

11. [The] *A* method of [claim 10, further] *forming a playing surface comprising:*
    (*a*) *forming a foundation;*
    (*b*) *placing more than one piece of synthetic grass turf on the foundation, the synthetic grass turf having a plurality of synthetic grass fibers extending generally vertically upward form a backing material;*
    (*c*) *placing a porous mesh material on the foundation between the foundation and the backing material of said synthetic grass turf so that the mesh material underlies adjoining edges of said pieces of synthetic grass turf;*
    (*d*) *filling the synthetic grass turf with a growth medium so that a top of the growth medium is approximately at the same height as a top of the synthetic grass fibers;*
    (*e*) *sowing natural grass on top of the growth medium so that the roots of the natural grass plants extend downward through the synthetic grass turf, through the mesh material, and into the foundation and so that blades of the natural grass plants extend upward from a top of the growth medium to form a playing surface of natural grass; and*
    placing a porous mesh material having protrusions extending from at least one side of the mesh material on the foundation between the foundation and the backing material.

15. A playing surface comprising:
    (a) a foundation;
    (b) a plurality of pieces of synthetic grass turf located on top of the foundation so that the edges of the pieces of synthetic turf are placed adjacent each other to form a continuous surface of synthetic grass turf, the synthetic grass turf including a backing material and a plurality of synthetic grass fibers extending generally vertically upward from the backing material, *the backing material having openings therethrough, the openings dispersed and distributed substantially across the entire surface area of the backing to permit a majority of the roots of natural grass plants to grow therethrough*;
    (c) a porous mesh material located between the foundation and the synthetic grass turf in the region of the edges of the synthetic grass turf so that the mesh material underlies the adjoining edges of the pieces of synthetic grass turf;
    (d) a layer of growth medium disposed in the synthetic grass turf to a depth sufficient to substantially fill the synthetic grass turf to the top of the synthetic grass fibers; and
    (e) natural grass, including blades and roots, planted in said growth medium so that the roots extend downward through the growth medium, the backing material, and into the foundation and so that the blades extend upward from the top of the layer of growth medium to form a playing surface.

24. A grass playing surface comprising:
    (a) a foundation;
    (b) an artificial grass turf located on top of the foundation, the artificial grass turf having generally vertically upright fibers mounted in a porous backing material, *the porous backing material the backing material having openings therethrough, the openings dispersed and distributed substantially across the entire surface area of the backing to permit a majority of the roots of natural grass plants to grow therethrough*;

(c) a layer of growth medium disposed in the artificial grass turf to a depth at least approaching the top of the fibers of the artificial grass turf; and (d) natural grass plants having grass blades, crowns and roots, the grass plants disposed in the growth medium, the roots extending downwardly through the growth medium *alongside the upright fibers, through* the [artificial grass turf] *porous backing material*, and into the foundation, the crowns being located slightly below the top of the artificial fibers and the grass blades extending upwardly above the top of the fibers forming a playing surface of substantially natural grass.

25. A grass playing surface comprising:

(a) a foundation;

(b) an artificial grass turf located on top of the foundation, the artificial grass turf having generally vertically upright fibers mounted in a porous backing material, *the porous backing material the backing material having openings therethrough, the openings dispersed and distributed substantially across the entire surface area of the backing to permit a majority of the roots of natural grass plants to grow therethrough, the fibers having at least one free end and extending upward in the same general direction*;

(c) a layer of growth medium disposed in the artificial grass turf to a depth at least approaching the top of the fibers of the artificial grass turf; and (d) natural grass plants having grass blades, crowns and roots, disposed in the growth medium, the roots extending downwardly through the growth medium *alongside the upright fibers, through* the [artificial grass turf] *porous backing material* and into the foundation, the blades extending upwardly above the top of the fibers forming a playing surface of substantially natural grass.

* * * * *